(12) United States Patent
Driscoll et al.

(10) Patent No.: US 9,885,422 B2
(45) Date of Patent: Feb. 6, 2018

(54) CHECK VALVE HAVING A FRICTION FREE REPLACEABLE VALVE INSERT CHECK ASSEMBLY

(71) Applicant: International Valve Corporation, West Des Moines, IA (US)

(72) Inventors: Steven Driscoll, Urbandale, IA (US); Brian Strait, Altoona, IA (US); Mark A. Novak, Clive, IA (US); Jason Marquardt, Waukee, IA (US)

(73) Assignee: International Valve Corporation, West Des Moines, IA (US)

( * ) Notice: Subject to any disclaimer, the term of this patent is extended or adjusted under 35 U.S.C. 154(b) by 124 days.

(21) Appl. No.: 14/968,962

(22) Filed: Dec. 15, 2015

(65) Prior Publication Data

US 2017/0167619 A1    Jun. 15, 2017

(51) Int. Cl.
*F16K 15/00* (2006.01)
*F16K 27/02* (2006.01)
*F16K 15/02* (2006.01)

(52) U.S. Cl.
CPC .......... *F16K 27/0209* (2013.01); *F16K 15/02* (2013.01); *F16K 15/026* (2013.01)

(58) Field of Classification Search
CPC .. F16K 15/028; F16K 15/063; F16K 27/0209; F16K 15/026; F16K 15/02
USPC ................. 137/515, 515.7, 543.23
See application file for complete search history.

(56) References Cited

U.S. PATENT DOCUMENTS

| | | | | |
|---|---|---|---|---|
| 646,902 A | * | 4/1900 | Haeberle | F16K 15/063 137/541 |
| 1,260,663 A | * | 3/1918 | Gould et al. | F16K 15/063 137/541 |
| 1,615,811 A | * | 1/1927 | Pearce | E21B 34/06 137/454.5 |
| 1,674,879 A | * | 6/1928 | Atkinson | F16K 15/06 137/515.7 |
| 1,779,421 A | * | 10/1930 | Cox | F16K 15/063 137/515.3 |
| 2,750,958 A | | 6/1956 | Baker et al. | |
| 2,844,164 A | * | 7/1958 | Robbins | F16K 15/063 137/454.6 |
| 3,122,159 A | * | 2/1964 | Milo | F16K 15/063 137/454.2 |
| 3,749,122 A | * | 7/1973 | Gold | F16K 15/063 137/515.7 |
| 3,800,824 A | * | 4/1974 | Medina | F16K 15/063 137/541 |
| 4,129,145 A | * | 12/1978 | Wynn | F16K 15/026 137/515 |
| 4,148,338 A | * | 4/1979 | Skoli | F16K 15/063 137/454.2 |
| 4,532,958 A | | 8/1985 | Napolitano | |

(Continued)

*Primary Examiner* — Umashankar Venkatesan
(74) *Attorney, Agent, or Firm* — McKee, Voorhees & Sease, PLC

(57) ABSTRACT

A check valve has a friction-free replaceable valve insert check assembly. The check assembly includes a poppet on which a spring is mounted engaging an axially moveable seat which in turn engages a seat on the inner end of the poppet biased into engagement by the spring. Upon separation of the inner and outer valve bodies the insert check assembly will freely separate from the valve body for inspection or replacement.

7 Claims, 5 Drawing Sheets

(56) References Cited

U.S. PATENT DOCUMENTS

| | | | |
|---|---|---|---|
| 4,537,384 A * | 8/1985 | Petersen | F16K 15/063 |
| | | | 137/469 |
| 4,809,738 A | 3/1989 | Scaramucci | |
| 4,911,196 A | 3/1990 | Kemp | |
| 5,172,720 A * | 12/1992 | Richards | F16K 15/063 |
| | | | 137/234.5 |
| 6,152,171 A | 11/2000 | Messick et al. | |
| 7,036,523 B2 | 5/2006 | Nixon et al. | |
| 7,874,307 B1 * | 1/2011 | Deocampo | F16K 15/033 |
| | | | 137/15.09 |

* cited by examiner

CHECK VALVE HAVING A FRICTION FREE REPLACEABLE VALVE INSERT CHECK ASSEMBLY

BACKGROUND OF THE INVENTION

The check valve having a replaceable valve assembly of U.S. Pat. No. 4,532,958 is representative of the prior art over which the present check valve is an improvement in that the insert check assembly may be readily inserted or removed without the need to overcome friction between the valve assembly and seals within the valve body.

SUMMARY OF THE INVENTION

The insert check assembly is spaced from the inside wall surface of the inlet body such that it may be freely inserted or removed from the inlet body for inspection or if appropriate replacement. The insert check assembly includes a first seat on a poppet having a coil spring engaging the bottom side of a second seat allowing the first seat to move axially within the passageway of the valve bodies between open and closed positions.

The second seat is positioned on an annular axial inner end edge of the inlet body against a first seal received in an annular recess in the inner end of the inlet body.

A second seal is positioned on the inlet body for engagement with the inner end of the outlet body. The inner ends of the inlet body and the outlet body are threadably engaged.

The insert check assembly thus is insertable in and removable from the inlet body inner end without the need to overcome friction with the passageway side wall of the inlet body. This allows fast inspection or replacement of insert check assemblies without the need of special tools other than a wrench to separate the inlet body from the outlet body. The insert check assembly is self-aligning upon field installation.

DETAILED DESCRIPTION OF THE PREFERRED EMBODIMENTS

Figure 1:
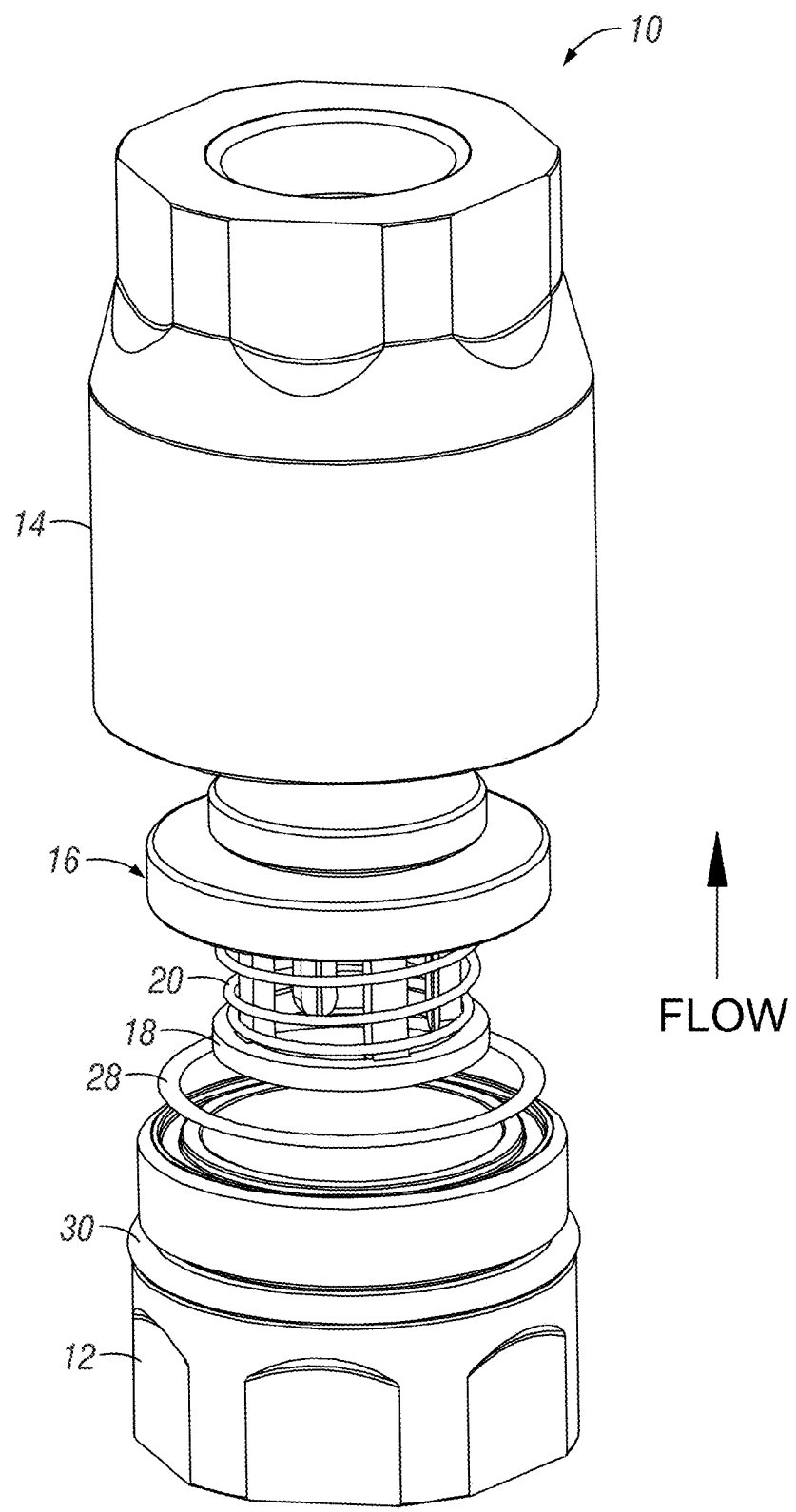
FIG. 1 is an exploded view of the check valve.
Figure 2:
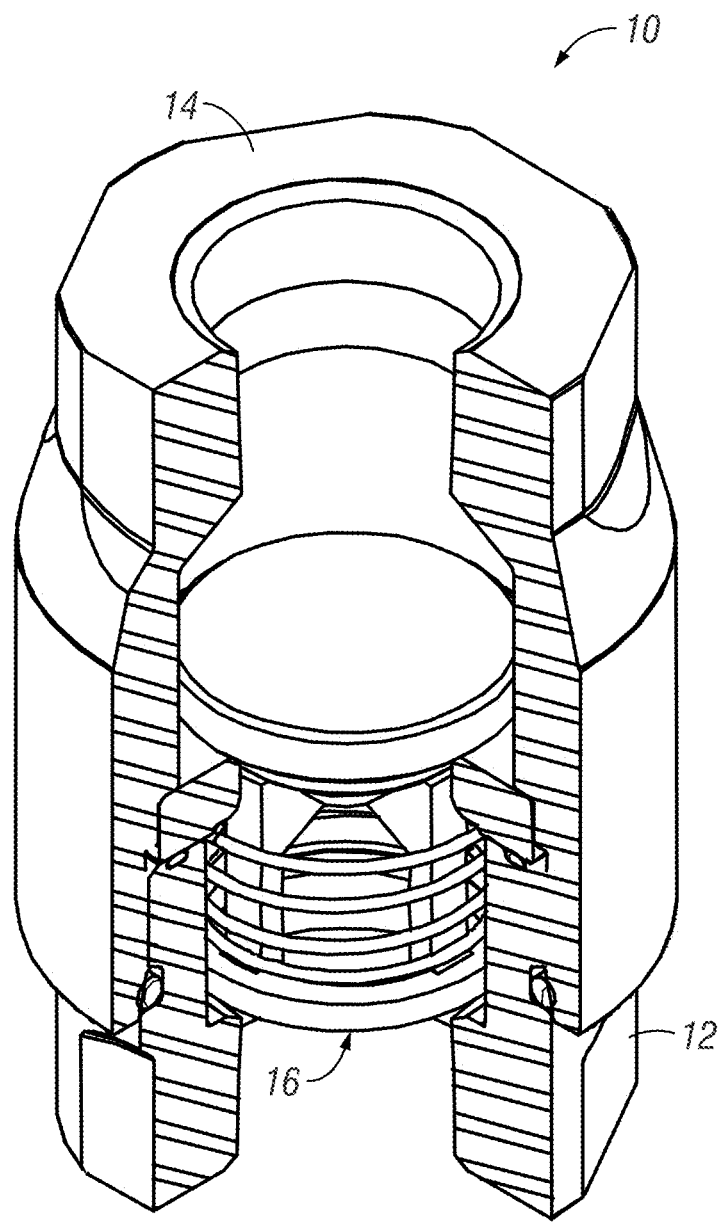
FIG. 2 is an exploded perspective view of the valve body showing the insert check assembly.
Figure 3:
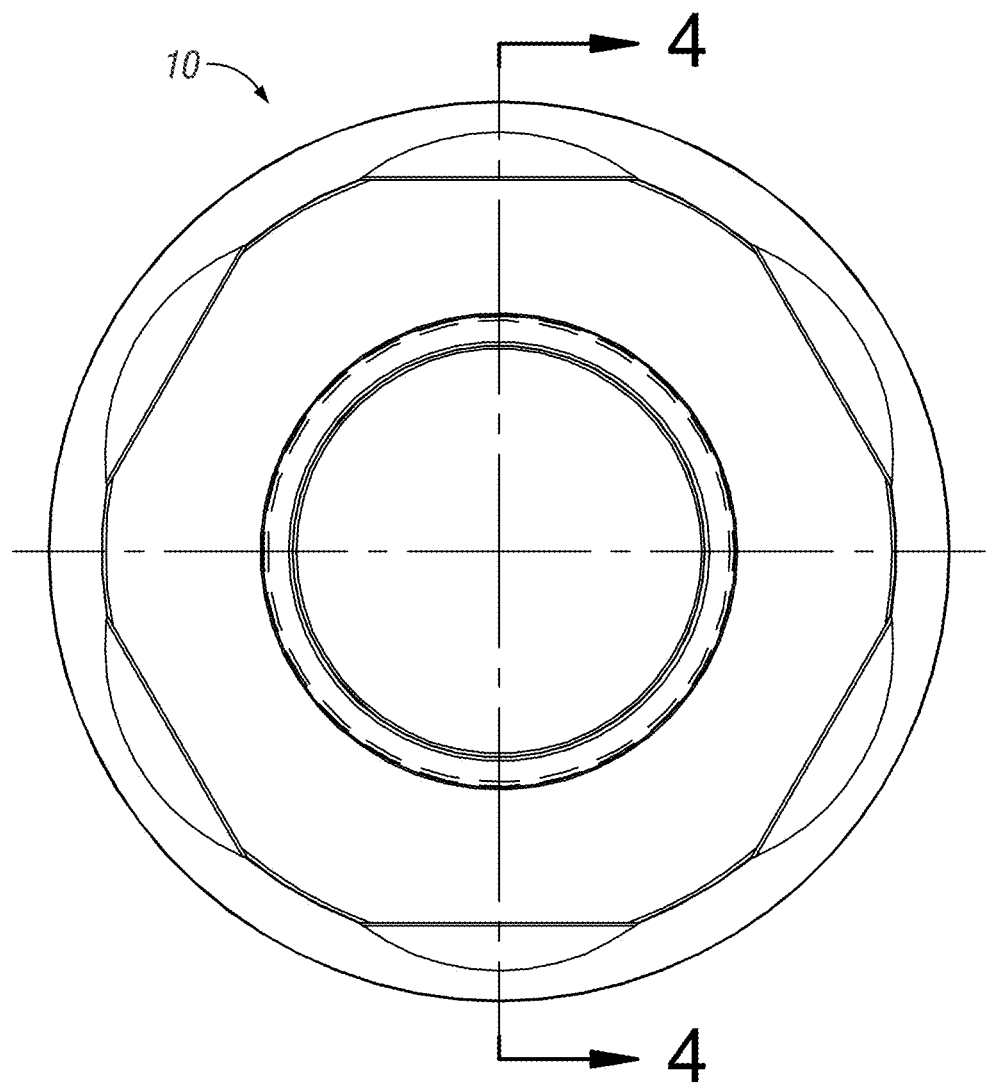
FIG. 3 is a top outlet end view of the valve assembly of FIG. 2.
Figure 4:
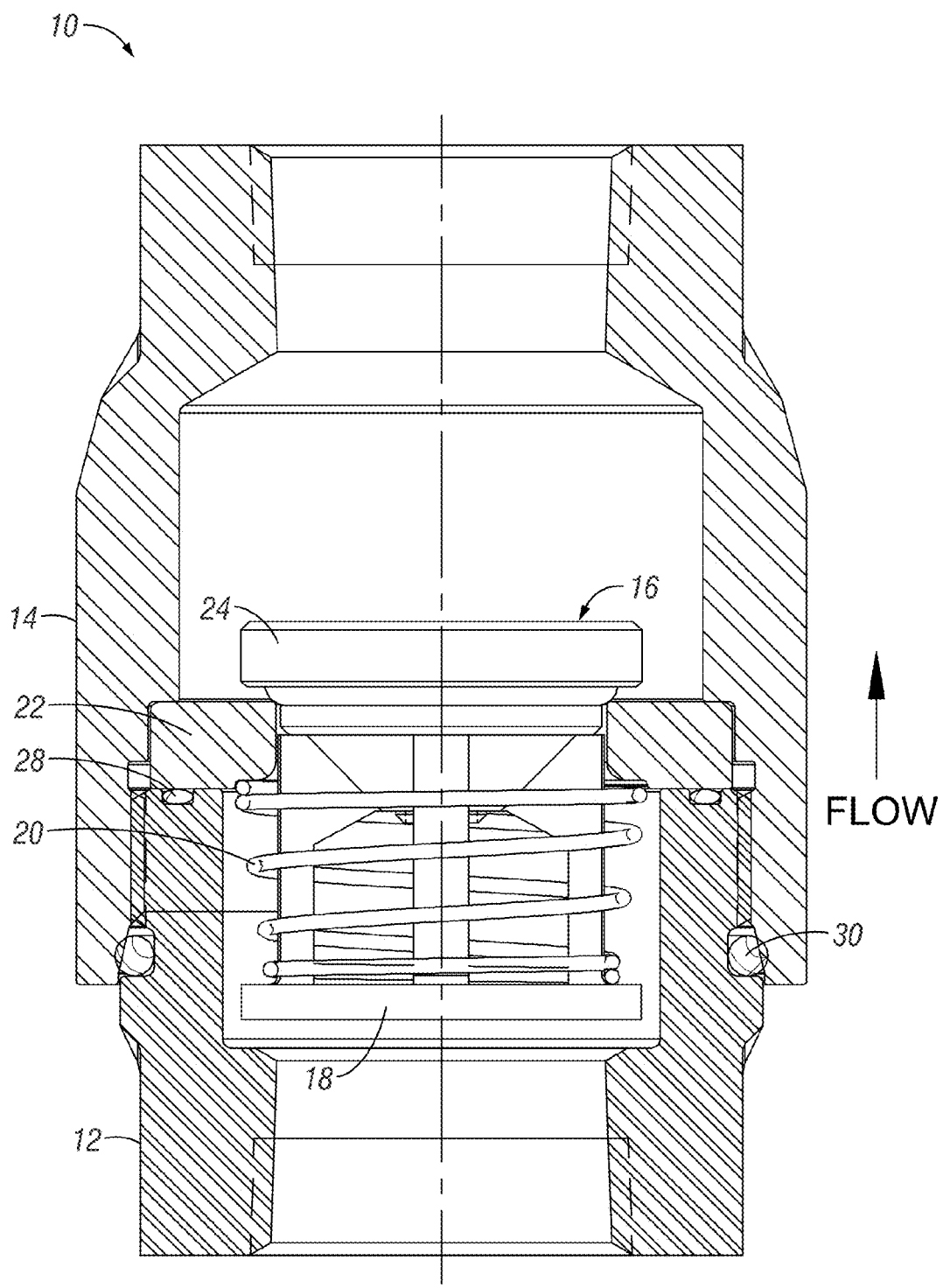
FIG. 4 is a cross sectional view taken along line 4-4 and FIG. 3.

The valve assembly of this invention is referred to generally by the reference numeral 10 in FIG. 2 and includes an inlet body 12 and an outlet body 14. An insert check assembly 16 is positioned in the inlet body 12 as seen in FIG. 4.

Figure 5:
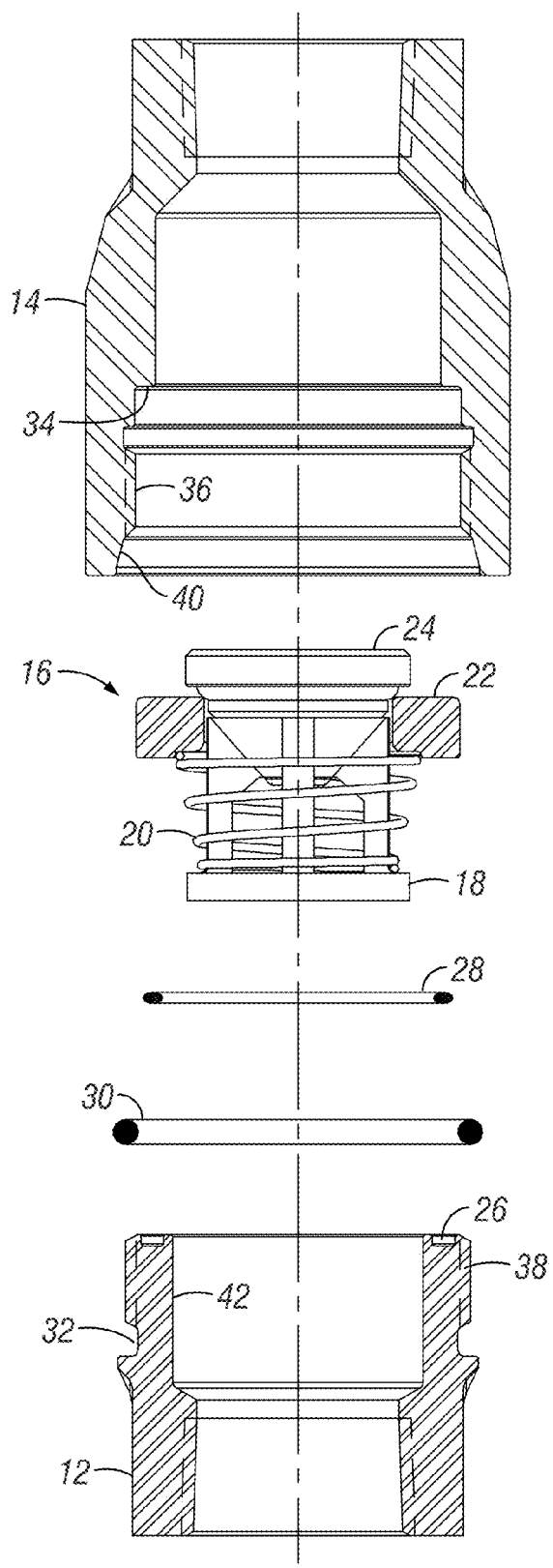
FIG. 5 is an axial exploded view of the valve assembly.

The insert check assembly 16 as seen in FIG. 5 includes a poppet 18 on which a spring 20 is mounted which engages a seat element 22 biased into engagement with a seat element 24. The poppet 18 is axially moveable relative to the seat element 22. The inlet body 12 includes an annular recess 26 which receives an insert seal 28. A body seal 30 is received in an annular recess 32 on the outer wall surface of the inlet body 12. The outlet body 14 includes an annular shoulder 34 which engages the seat 22 pressing it into engagement with the insert seal 28 in the annular recess 26 when the valve is fully assembled as seen in FIG. 4.

The outlet body 14 is threadably attached to the inlet body 12 through threading 36 on the outlet body and 38 on the inlet body with the inner end of outlet body 14 having an annular shoulder 40 engaging the body seal 30 received in the annular groove 32.

When attention to the valve assembly is required in the field of use the outlet body 14 is easily removed from the inlet body 12 and the insert check assembly 16 will likely fall out for easy inspection and if appropriate, replacement of the insert check assembly 16. It is particularly noted that removal of the insert check assembly does not require tools or overcoming any friction with either the inlet body 12 sidewall 42 or any part of the outlet body 14. If necessary the insert seal 28 and body seal 30 which are O-rings may also be easily replaced in the field.

It can be readily seen from FIGS. 4 and 5 that there is no need for lubricant for installing the O-rings 28 and 30 or the insert check assembly 16 so there is no potential for contamination associated with the replaceable seals 28 and 30 and insert check assembly 16. It is also seen that the check assembly 16 is self-aligning upon field installation.

What is claimed is:

1. A valve assembly comprising:
   inlet and outlet bodies having inner and outer ends releaseably interconnected at said inner at said inner ends and having a passageway extending there through
   an insert check assembly positioned in said passageway of said inlet body, said insert check assembly having a poppet having inner and outer ends, said poppet inner end having a first seat being positioned at the inner end of sad outlet body, a second seat loosely positioned on said poppet between said first seat and a spring biasing said first and second seats into engagement;
   said second seat being positioned on and entirely above the inner end of the inlet body radially outwardly of said passageway;
   said interconnection of said inlet and outlet bodies includes said inner end of said outlet body engaging said second seat allowing said first seat to move between open and closed positions; and
   said inlet body having an inner passageway wall spaced from said insert check assembly allowing for friction free insertion into and removal from said inlet body passageway.

2. The valve assembly of claim 1 wherein said inlet body inner end radially outwardly of said passageway includes a first seal engaging said second seat.

3. The valve assembly of claim 2 wherein said inlet body has an outer wall side and said outlet body has an inner wall side, and a second seal is positioned therebetween.

4. The valve assembly of claim 3 wherein said first and second seals are O-rings.

5. The valve assembly of claim 3 wherein said first seal is positioned in an annular recess in the inlet body inner end radially outwardly of said passageway with said first seal engaging said second seat.

6. The valve assembly of claim 5 wherein said second seal is positioned on said inlet body adjacent the inner end of the outlet body.

7. The valve assembly of claim 6 wherein aid outlet body includes threading axially inwardly of said second seal.

* * * * *

UNITED STATES PATENT AND TRADEMARK OFFICE
CERTIFICATE OF CORRECTION

PATENT NO. : 9,885,422 B2
APPLICATION NO. : 14/968962
DATED : February 6, 2018
INVENTOR(S) : Steven Driscoll et al.

It is certified that error appears in the above-identified patent and that said Letters Patent is hereby corrected as shown below:

In Column 2, Claim 7, Line 62:
DELETE "aid" after the word wherein
INSERT --said-- after the word wherein Signed and Sealed this
Fifteenth Day of May, 2018

Andrei Iancu
*Director of the United States Patent and Trademark Office*